May 13, 1958 V. W. PARTON 2,834,482
LUMBER HACK EXTRACTOR
Filed Dec. 27, 1955 3 Sheets-Sheet 1

Verno W. Parton
INVENTOR.

BY
Attorneys

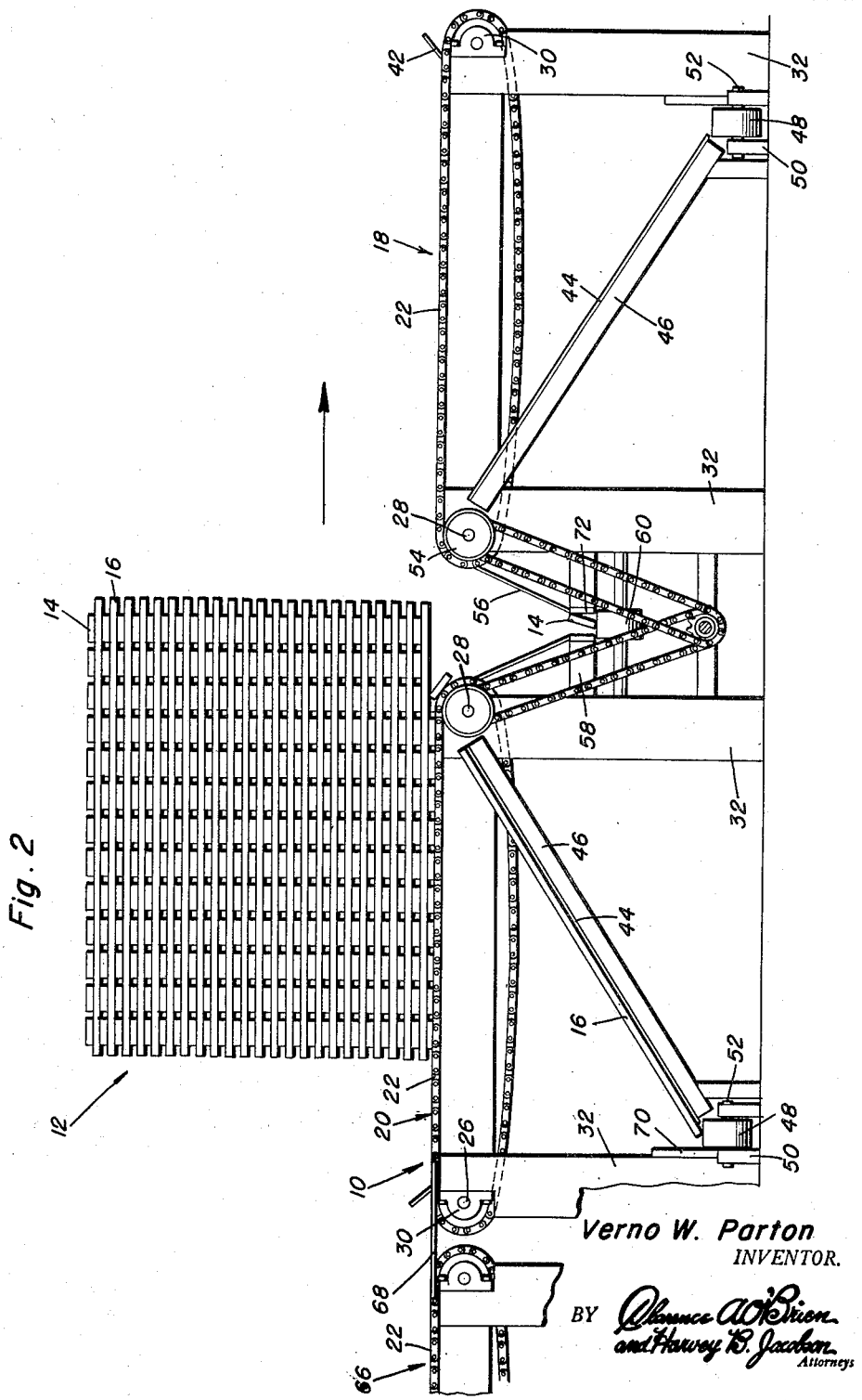

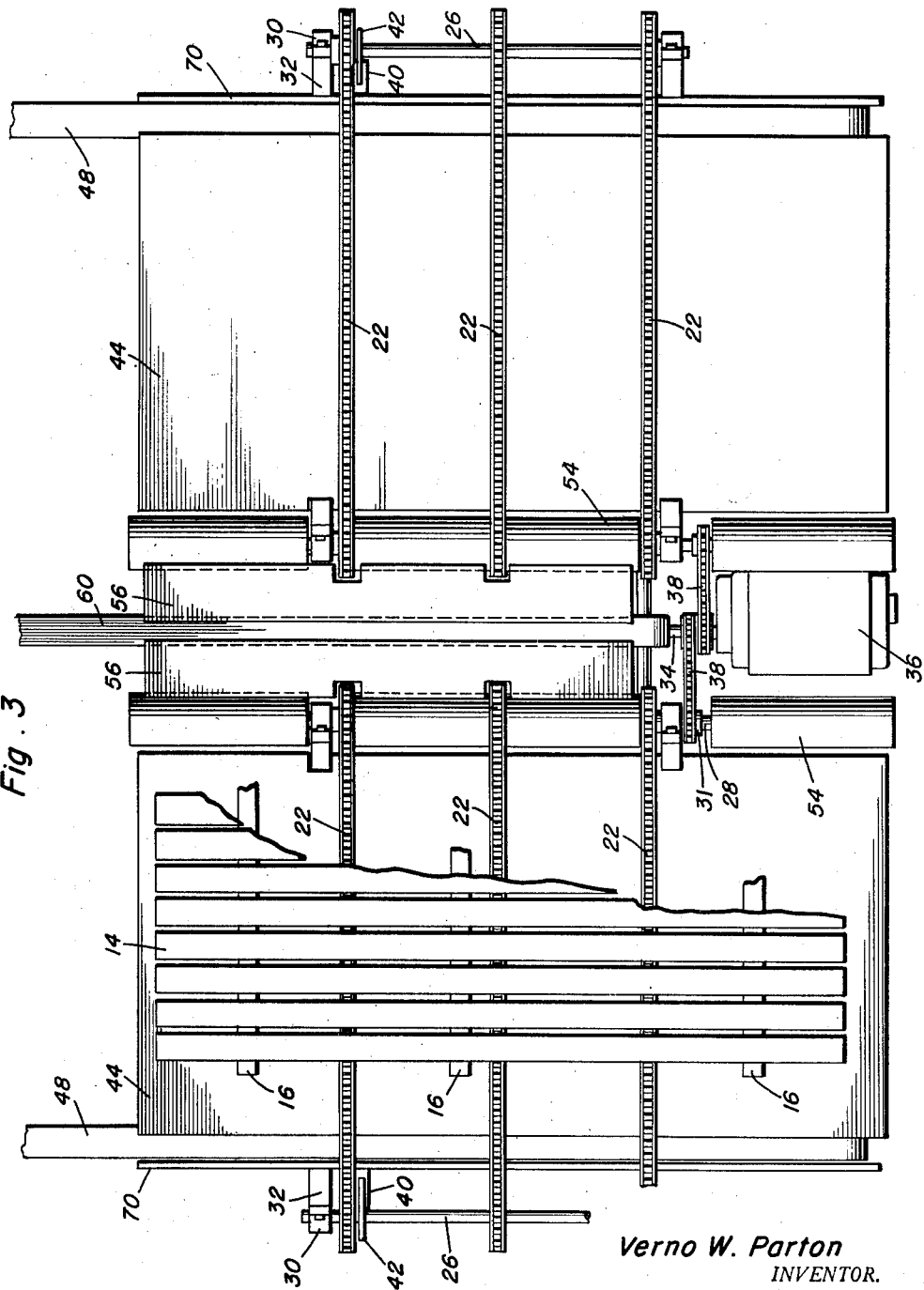

United States Patent Office 2,834,482
Patented May 13, 1958

2,834,482

LUMBER HACK EXTRACTOR

Verno W. Parton, Rutherfordton, N. C.

Application December 27, 1955, Serial No. 555,425

3 Claims. (Cl. 214—8.5)

This invention generally relates to a device for extracting individual pieces of lumber from a lumber hack.

In the lumber industry, individual pieces of lumber are normally stacked in a plurality of vertically disposed layers with spacing strips or laths disposed between adjacent layers for permitting the circulation of air for the curing and drying of such lumber. These stacks of lumber are generally called lumber hacks and these hacks are normally handled by fork trucks or the like which provide a very efficient manner of handling the lumber hacks. However, when it is desired to unstack the lumber for final dressing or for other treatment, it is a tedious job for laborers to individually pick up each piece of lumber and then the spacing strips and feed the lumber to its final dressing operation or for loading on a truck or the like. Accordingly, it is the primary object of the present invention to provide a device for automatically unstacking or extracting the individual pieces of lumber from a lumber hack wherein the entire lumber hack will be automatically unstacked and the spacing strips will also be conveyed to a remote area for re-use when forming the lumber hacks.

Another object of the present invention is to provide a lumber hack extractor including a pair of reversible conveyors having a pair of endless chain members which are disposed in spaced relation to permit downward discharge of individual pieces of lumber.

Yet another object of the present invention is to provide a lumber hack extractor in accordance with the preceding objects in which a conveying mechanism is provided for automatically conveying the spacer strips to a remote area for re-use if desired.

Other important objects of the present invention will reside in its simplicity of construction, efficiency of operation, automatic features, adaptation for its particular purposes and its relatively inexpensive manufacturing and maintenance cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a side elevational view of the lumber hack extractor; and

Figure 3 is a top plan view of the lumber hack extractor with portions of the lumber hack being broken away for illustrating the inclined ramps for feeding the spacing strips to the spacing strip conveyors.

Figure 1:
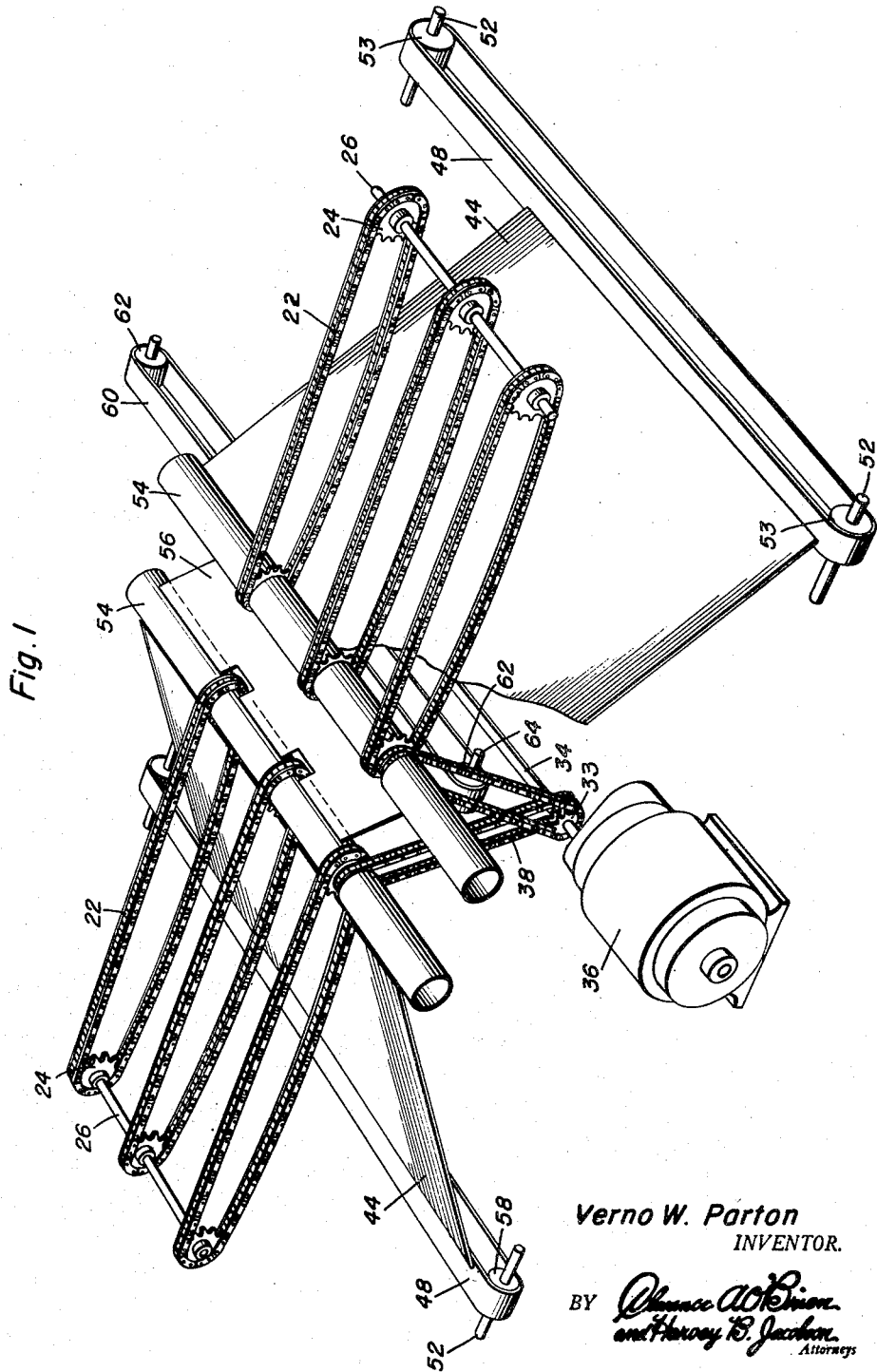
Figure 1 is a schematic perspective view of the lumber hack extractor of the present invention.

Referring now specifically to the drawings, the numeral 10 generally designates the lumber hack extractor of the present invention and the numeral 12 generally designates a lumber hack including a plurality of layers of boards 14 which are separated by a plurality of spacer strips 16 which are exaggerated in size for purposes of clarity. The boards 14 in each layer are disposed in spaced relation and the spacer strips 16 are in widely spaced relation to permit circulation of air substantially completely about each board 14 to permit curing thereof and also to prevent warping of the boards during the curing operation.

The purpose of the present invention is to separate the individual boards 14 for transportation to another area either for loading onto a truck or for a final dressing and also to discharge the spacer strips 16 to a remote area for re-use wherein the entire separating action or extraction of the pieces of the lumber or boards 14 will be automatic in operation.

The lumber hack extractor 10 generally includes a pair of conveyor systems 18 and 20 which are reversible and each of which includes a plurality of endless conveyor chains 22 which encircle sprocket gears 24 disposed on remotely positioned horizontally aligned shafts 26 and 28. The shafts 26 and 28 are supported on bearings 30 mounted on the upper end of vertical support members 32. It will be understood that any supporting frame structure may be employed which is sufficiently strong to adequately support the lumber hack 12. As illustrated, each of the inner shafts 28 is disposed in aligned parallel and spaced relation with the area between the conveyor systems 18 and 20 permitting discharge of successive boards 14 from the lowermost layer of boards 14 in the lumber hack 12.

Each of the shafts 28 is provided with a drive sprocket gear 31 which is in alignment with a similar drive sprocket gear 33 on an elongated drive shaft 34 extending from an electric motor 36. Encircling the aligned pairs of drive gears 31 and 33 is an endless sprocket chain 38 for transmitting rotational force to the shafts 28 thereby transmitting translatory motion to the endless conveyor chains 22 for driving the endless conveyor chains 22 in the same direction. Inasmuch as the conveyor chains 22 in each of the conveying systems 18 and 20 move in the same direction at the same rate of speed, the lumber hack 12 will be moved from the conveyor system 20 to the conveyor system 18 as illustrated by the arrow in Figure 2. Due to the relative lengths of the space between adjacent shafts 28 and the length of the lumber hack 12, the lumber hack 12 will not tilt nor tend to tilt since it will remain in a horizontal position until the leading edge thereof will engage the set of endless conveyor chains 22 towards which it is approaching. Mounted on the supporting frame members 32 adjacent the outer limits of the movement of the upper flight of the conveyor chains 22 is a reversing switch 40 having an upstanding actuating lever 42 which is disposed above the upper flight of the conveyor chains 22 and in the path of movement of the lumber hack 12 whereby the lumber hack 12 when it moves to its outermost position on the conveyor system 18 of Figure 2 will strike the actuating lever 42 of the reversing switch 40 thereby reversing the direction of rotation of the electric motor 36 for reversing the direction of the shafts 34 and 28 thereby reversing the direction of movement of the upper flight of the conveyor chains 22 for moving the lumber hack 12 back along the same path of movement onto the conveyor system 20 from the conveyor system 18. During its initial movement from the conveyor system 20 onto the conveyor system 18, the complete lower layer of boards 14 has dropped off and downwardly between the adjacent conveyor systems 20 and 18. As the lumber hack 12 progresses onto the conveyor system 18, the strips 16 will begin to fall downwardly under conveyor system 18 since they are misaligned with the conveyor chains 22. These strips will fall upon an inclined ramp 44 which is supported on suitable framing 46 and is downwardly and outwardly inclined. For purposes of illustration, one of the strips 16 has been illustrated on the ramp 44 in Figure 2 and this strip 16 has just fallen downwardly onto the ramp 44 before the lumber hack 12 engaged the reversing switch lever 42 on the conveyor system 20.

An endless belt conveyor 48 is provided at the lower end of each of the ramps 44 and is supported on suitable support members 50 and is provided with a transverse shaft 52 for supporting the end pulleys 54 of the spacer strip conveyor wherein the endless belt conveyor will discharge the spacer strip 16 to any desired remote area for re-use or disposal in any suitable manner. It is noted that the endless strip conveyor 48 is disposed transversely or perpendicular to the movement of the lumber hack 12 whereby the strips 16 will be disposed in an out-of-the-way position.

To facilitate the movement of the lumber hack 12 and in order to prevent entangling of the boards 14 and strips 16 with the various operating mechanism, the shafts 28 are provided with enlarged cylindrical members 54 throughout the length thereof except where the conveyor chains 22 pass and the sprocket gears 24 are located. The cylindrical member 54 on conveyor system 18 will guide the strips 16 onto ramp 44 under conveyor system 18 when the hack 12 moves in the direction of the arrow in Figure 2.

Extending downwardly and in generally tangential relation to the cylindrical members 54 are guide plates 56 which are inclined inwardly and are supported on suitable support brackets 58 for guiding the boards 14 onto an endless conveyor belt 60 having an end pulley 62 supported on a transverse shaft 64 which is journaled on the vertical support members 32.

The spacer strip conveyors 48 and the board conveyor 60 are powered by a separate source of power wherein the direction of these conveyors will be constant while the power motor 36 for driving the conveyor chains 22 will be reversed by the reversing switches 40. The specific electrical diagram has not been illustrated since any suitable electrical arrangement may be employed wherein movement of the lever 42 by contact with the lumber hack will reverse the direction of rotation of the motor 36.

As illustrated in Figure 2, the feed conveyor system generally designated by the numeral 66 is provided and is similar in construction to the conveyor systems 18 and 20 for feeding the lumber hacks 12 onto the conveyor system 20. The horizontally disposed runner 68 interconnects the upper ends of the vertical support members 32 on the conveyor system 20 and the conveyor system 66 for bridging the space between the conveyor system and the conveyor system 66 to prevent the individual boards 14 from falling between the conveyor systems 20 and 66.

Also, it is to be noted that guide boards or rails 70 are provided along the outer edges of the conveyors 48 in opposition to the ramp 44 to limit the movement of the spacer strips 16 as they proceed down the ramps 44 since they normally proceed down these ramps in an endwise direction whereby the rails 70 will prevent entanglement of the strips 16 with the vertical supports 32. Also, the inclined plates 56 terminate in guide rails 72 for the lumber conveyor 60 wherein the individual pieces of lumber or boards 14 will be retained on the lumber conveyor 60 during the movement thereof.

It will be understood that the number of conveyor chains 22 may be varied and any suitable type of power mechanism may be employed as long as it is easily reversible for driving the conveyor systems 18 and 20 in reverse direction. Various types of structural elements may be employed for constructing the supporting framework for the device and any suitable bearings and lubrication means therefor as may become necessary may be employed.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A device for extracting pieces of lumber from lumber hacks having intermediate spacer strips between the layers of lumber, said device comprising a pair of reversible conveyor systems disposed in spaced relation in the direction of movement of a lumber hack supported on the conveyor systems, said spacing between the conveying systems being of a width to permit passage of pieces of lumber therethrough, said reversible conveyor systems being adapted to feed a lumber hack alternatively in each direction over said space between the conveyor systems to allow the pieces of lumber constituting the lowermost layer to fall down between said conveyor systems, conveying means between the conveyor system for carrying the extracted pieces of lumber transversely of the conveyor systems, means for transporting the spacer strips away from the conveyor systems, each of said conveyor systems including a supporting frame, remotely spaced shafts on said frame, sprocket gears arranged in aligned pairs on said shafts, an endless conveyor chain encircling each pair of sprockets with the upper flight of said chains forming a support for the lumber hack, and means for simultaneously driving said conveyor chains on each system in the same direction and at the same speed, said transporting means for the spacer strips including an inclined collecting ramp under each conveyor system and extending substantially the full distance between the conveyor chains for accommodating randomly arranged spacer strips, each ramp being downwardly and outwardly inclined, and conveying means at the lower edge of each ramp for carrying the strips to a remote area.

2. The combination of claim 1 wherein the adjacent shafts on each of the conveyor systems is provided with enlarged cylindrical members extending substantially the full distance between the conveyor chains, each of said strip conveying means including an endless belt conveyor having the upper flight thereof disposed in underlying relation to the lower edge of the ramp, a rail extending along the outer edge of the upper flight of the belt conveyor for limiting the movement of the spacer strips down the ramp and positioning the leading end of the strips on the upper flight of the belt conveyor for moving the strips longitudinally along the belt conveyor in substantially perpendicular relation to the direction of movement of the lumber hack.

3. The combination of claim 2 wherein said ramps and cylindrical members extend laterally beyond the outermost of the conveyor chains for receiving spacer strips disposed laterally outwardly of the conveyor systems, the cylindrical member on one conveyor system forming a support for the free ends of the spacer strips above the lowermost layer of pieces of lumber as the hack moves from the other conveyor system onto the one conveyor system which removes the lowermost layer thus revealing the spacer strips above the lowermost layer whereby the spacer strips will be guided onto the ramp under said one conveyor system.

References Cited in the file of this patent
UNITED STATES PATENTS 2,696,311     Nordstrom  ------------- Dec. 7, 1954